(12) United States Patent
Järvi

(10) Patent No.: US 7,231,028 B2
(45) Date of Patent: Jun. 12, 2007

(54) METHOD AND SYSTEM FOR THE MANAGEMENT OF SUBSCRIBER FUNCTIONS

(75) Inventor: Jukka Järvi, Puuppola (FI)

(73) Assignee: Nokia Corporation, Espoo (FI)

( * ) Notice: Subject to any disclaimer, the term of this patent is extended or adjusted under 35 U.S.C. 154(b) by 518 days.

(21) Appl. No.: 09/774,998

(22) Filed: Jan. 31, 2001

(65) Prior Publication Data

US 2001/0053211 A1    Dec. 20, 2001

Related U.S. Application Data

(63) Continuation of application No. PCT/FI99/00641, filed on Jul. 27, 1999.

(30) Foreign Application Priority Data

Aug. 13, 1998  (FI) .................................... 981752

(51) Int. Cl.
*H04M 3/42* (2006.01)
*H04Q 5/22* (2006.01)
*G06F 12/00* (2006.01)
*G06F 17/30* (2006.01)

(52) U.S. Cl. ............................. 379/201.01; 340/10.32; 707/201

(58) Field of Classification Search ................. 455/433, 455/411; 379/114.02, 144.01, 201.01, 216.01, 379/142.16; 340/10.32; 707/201
See application file for complete search history.

(56) References Cited

U.S. PATENT DOCUMENTS

| 5,483,585 | A | * | 1/1996 | Parker et al. | .......... 379/216.01 |
| 5,696,906 | A | | 12/1997 | Peters et al. | ................. 395/234 |
| 5,805,682 | A | * | 9/1998 | Voit et al. | .............. 379/142.16 |
| 5,893,116 | A | * | 4/1999 | Simmonds et al. | ......... 707/201 |
| 6,081,705 | A | * | 6/2000 | Houde et al. | ................ 455/411 |
| 6,119,001 | A | * | 9/2000 | Delis et al. | ................. 455/433 |
| 6,137,872 | A | * | 10/2000 | Davitt et al. | ........... 379/144.01 |
| 6,463,139 | B1 | * | 10/2002 | Davitt et al. | ........... 379/144.01 |
| 6,784,786 | B1 | * | 8/2004 | Sumner | ................... 340/10.32 |

FOREIGN PATENT DOCUMENTS

| EP | 0 207 255 | 1/1987 |
| JP | 8-79370 | 3/1996 |
| WO | WO 96/15633 | 5/1996 |
| WO | WO 96/31987 | 10/1996 |
| WO | WO 98/31169 | 7/1998 |

* cited by examiner

*Primary Examiner*—Ahmad F. Matar
*Assistant Examiner*—Thjuan P. Knowlin
(74) *Attorney, Agent, or Firm*—Squire, Sanders & Dempsey L.L.P.

(57) ABSTRACT

The present invention relates to a method and system for the management of subscriber functions in a digital telephone exchange. According to the invention, the functions for default subscribers are stored in and read from default records common to the subscribers, and only the functions for special subscribers are stored in and read from subscriber-specific records. The invention allows significantly faster execution of operations applying to subscriber functions.

11 Claims, 1 Drawing Sheet

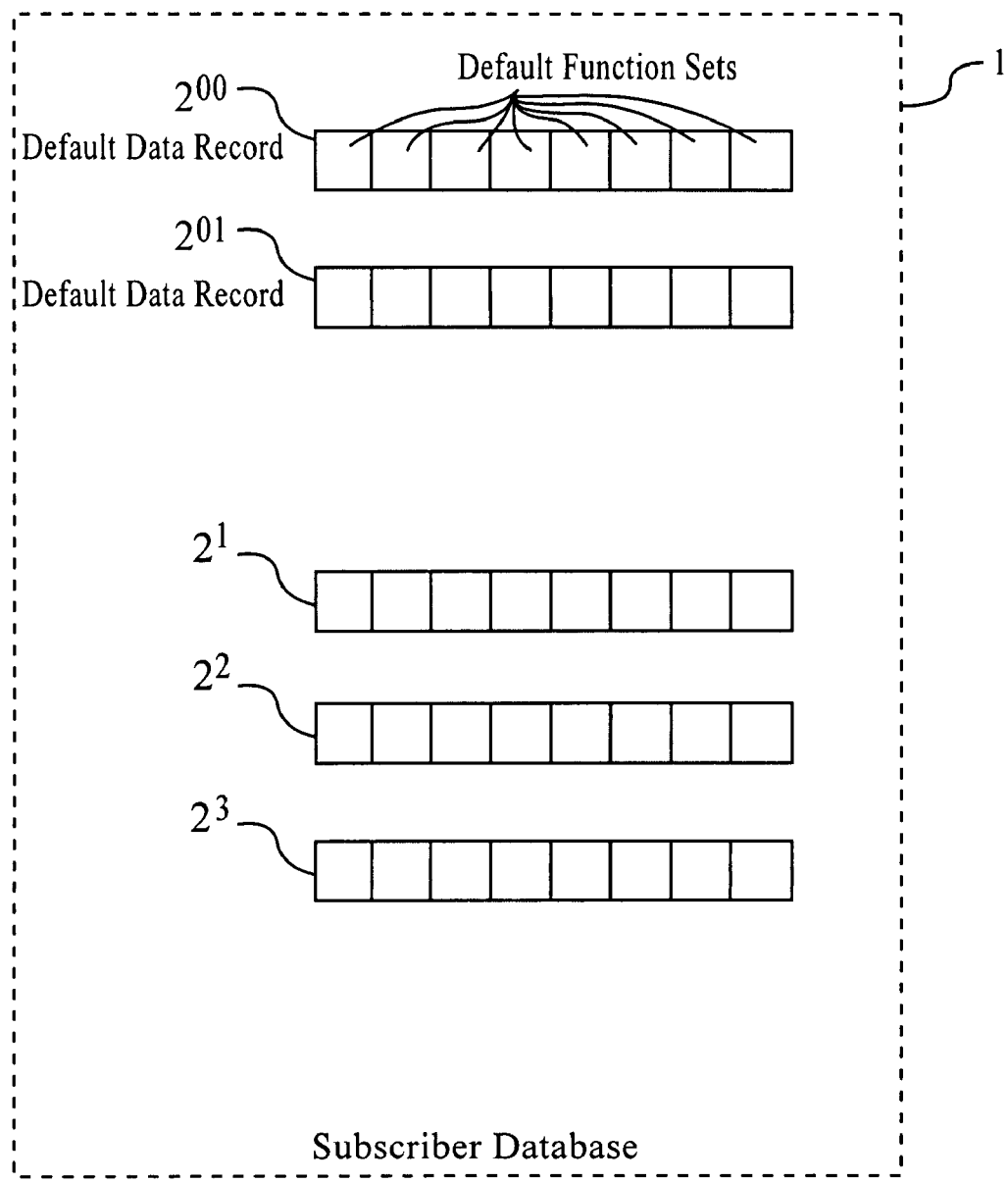

METHOD AND SYSTEM FOR THE MANAGEMENT OF SUBSCRIBER FUNCTIONS

This application is a continuation of international application Ser. No. PCT/FI99/00641, filed 27 Jul. 1999.

FIELD OF THE INVENTION

The present invention relates to telecommunication. In particular, the invention relates to a new and advanced method and system for the management of subscriber functions.

BACKGROUND OF THE INVENTION

At present, for each subscriber in a telephone exchange, there are about 130 subscriber functions. Most (about 80%) of these functions are of a nature that that does not allow any changes to be made in them by the subscriber him/herself via his/her telephone. Generally, these functions are also operator-specific rather than subscriber-specific. In practice, for about 90% of the subscribers in the exchange, these functions are the same.

For each subscriber, an individual subscriber record of a length under one hundred bytes for has been reserved the storage of subscriber functions. When a subscription is created, certain default functions are created for it, and these can be defined specifically for the operator and for the exchange in conjunction with the delivery of the exchange and later using MML (Man Machine Language, MML) commands. However, once the subscription has been created, there is no information available as to whether the functions included in the default set of functions are still valid for the subscriber or whether they have been changed.

A problem with the present arrangement is the slowness of any operations pertaining to subscriber functions. For instance, if all subscribers in an exchange are to be given the right to call transfer, then it will be necessary to use MML commands applying to the functions defined for each subscriber. As there are hundreds of thousands of subscribers, this process may take several weeks.

On the other hand, if subscribers are to be transferred from one exchange to another, then it will be necessary to first read all the subscribers in the old exchange, in other words, a MML command is issued that will print out the functions defined for each subscriber. After that, the functions for each subscriber are read one by one. In this way, the data for hundreds of subscribers at a time are transferred to a computer, whereupon they are created again in the other exchange using MML commands via the computer in question. These operations are repeated in batches of a few hundred subscribers until all the subscribers have been transferred. Although the transfer is carried out by computer, it has to be done at a quiet time at night, so the time available for this is about five hours a day. In addition, since the data in question is in ASCII form (American Standard Code for Information Interchange, ASCII) and has to be processed character by character, the process for each subscriber takes as long as 20–30 seconds. For example, to complete the transfer of a hundred thousand subscribers in practice takes several weeks.

The object of the present invention is to disclose a new type of method that will eliminate the drawbacks described above. A specific object of the present invention is to disclose a method and system for the optimisation of subscriber functions and their management.

BRIEF DESCRIPTION OF THE INVENTION

The method of the invention for the management of subscriber functions is used to manage the subscriber functions for subscribers in a digital telephone exchange. The subscriber functions are stored in records. Subscriber functions include e.g. call transfer, call waiting and conference between three parties. Some of the functions are default functions, and these make up a default function set. One or more default function sets are provided, depending on the need. The functions comprised in the default function sets may already have been defined specifically for the operator and/or exchange at the time when the exchange was delivered to the operator.

According to the invention, subscriber functions consistent with default function sets are stored in default records common to the subscribers, the subscriber functions consistent with each default function set being stored in a separate default record. Further, according to the invention, the subscriber functions for each default subscriber are read when needed from the default record containing the default function set that defines the subscriber functions for the default subscriber in question. Default subscriber refers to a subscriber having subscriber functions corresponding to one of the default function sets. When a default function set is modified, the subscriber functions for the default subscribers concerned are changed accordingly. Further, according to the invention, the subscriber functions for special subscribers are stored in a subscriber-specific record for each subscriber. Special subscriber refers to a subscriber for whom the subscriber functions are different from the default definitions. Further, according to the invention, the subscriber functions for special subscribers are read when needed from the subscriber-specific records stored for the subscribers in question.

As compared with prior art, the present invention has the advantage that it significantly accelerates operations concerning subscriber functions. At present, changes applying to subscriber functions have to be made separately for each subscriber, whereas in the solution of the invention about 90% of the subscribers can be dealt with by applying the changes to default records only, while subscriber-specific modifications only need to be made for the remaining 10% of the subscribers. For instance, the operations needed to extend and activate new functions e.g. for the subscribers in an exchange or home location register can be carried out hundreds of times faster than before. A transfer of subscribers from one exchange to another can be accomplished at least ten times faster because about 90% of the subscribers can be transferred by reading all default function subscribers from the old exchange and a mere subscriber creation command in the new exchange is sufficient to make the default functions visible for them. Only for the remaining 10% of the subscribers is it necessary to read and create the functions separately for each subscriber. Therefore, instead of taking weeks, the transfer is accomplished in a matter of days. A further advantage of the invention is an economy in storage space because the size of the subscriber database can be reduced to about a tenth. Moreover, queries regarding functions can be performed faster as the default functions can be read from one and the same place.

In an embodiment of the invention, data indicating whether the subscriber is a default subscriber or a special subscriber is provided in conjunction with the subscriber number of each subscriber.

In an embodiment of the invention, when the subscriber functions for a special subscriber are modified, the modified functions are checked to establish whether they correspond to any one of the default function sets. If they do, the special subscriber is again treated as a default subscriber.

In an embodiment of the invention, the subscriber functions for a special subscriber are not placed in a subscriber-specific record until one of the functions in question is activated for use for the first time.

In an embodiment of the invention, the default definitions are subscriber type-specific. Subscriber types include e.g. analogue subscriber, ISDN subscriber, RCSC subscriber (subscriber with alarm function with computation) and RCSN subscriber (subscriber with alarm function without computation). In other words, the default function sets are determined according to an assumed user profile.

BRIEF DESCRIPTION OF THE DRAWINGS

In the following, the invention will be described by the aid of a few examples of its embodiments with reference to the attached drawing, wherein a diagram illustrates a system according to the invention.

DETAILED DESCRIPTION OF THE INVENTION

The drawing presents an embodiment of the system of the invention. The system comprises a GSM network 1, default records $2^{00}$ and $2^{01}$ and a number of special records $2^1$, $2^2$ and $2^3$. The default function sets are defined specifically for each operator and/or exchange. In practice, the functions for about 90% of the subscribers will not be changed at all from the default definitions. Operations concerning subscriber functions are thus significantly accelerated because, according to the invention, the default functions are stored in the default records $2^{00}$ and $2^{01}$ and the subscriber number is only provided with data indicating whether the subscriber is a default subscriber or not. In the case of a default subscriber (in about 90% of all cases), the functions are read from the default record in question.

In practice, the circumstance whether the subscriber is a default subscriber can be expressed e.g. by using the same subscriber information index terminating the analysis. If the functions for the subscriber are changed, i.e. the subscriber becomes a special subscriber, then e.g. the default function bit is reset to zero (in other words, the subscriber is given a specific subscriber information index) and a subscriber-specific record $2^1$ is allocated for the subscriber, from which record the functions for that subscriber are subsequently read. When the functions for a special subscriber are changed, a check is carried out to establish whether the functions after the change correspond to one of the default function sets. If this is the case, then the subscriber is redefined as a default subscriber. On the other hand, if a default function set is modified, then the changes will apply to all the default subscribers concerned. For example, if the operator wishes to give all subscribers connected to an exchange the right to call transfer, then, according to the invention, an MML command applying to the default functions is all that is needed, whereas at present it is necessary to issue commands applying to the functions for each subscriber. In addition, according to the invention, it is possible that a subscriber-specific record is only allocated when the function in question is activated for the first time. For instance, in the case of call transfer, a subscriber-specific record is only allocated when the subscriber activates the call transfer function for the first time and therefore needs space for a C-number, and not directly when the subscriber is given permission to make use of the call transfer function.

Moreover, according to the invention, the default functions can be defined specifically for each subscriber type. For example, separate default function sets are provided for each subscriber type specified in subscriber function MML, such as e.g. analogue subscriber, ISDN subscriber, FM subscriber (subscriber for remote-controlled call transfer), FMRB subscriber (subscriber for telephone number check via telephone set) and AD&C subscriber (call duration and charge indication). In other words, the default function sets are defined according to an assumed user profile. Even if it should be necessary to use dozens of different default function sets, it would still be considerably less than in the current system where each one of e.g. a hundred thousand users has his/her own set.

The invention is not restricted to the examples of its embodiments described above, but many variations are possible within the scope of the inventive idea defined in the claims.

The invention claimed is:

1. A method comprising:
    defining one or more default function sets, each default function set comprising one or more subscriber functions of a digital telephone exchange defined as default functions;
    partitioning subscribers of said digital telephone exchange into default subscribers and special subscribers, said default subscribers being those subscribers whose subscriber functions correspond to one of said default function sets, and said special subscribers being those subscribers whose subscriber functions do not correspond to any of said default function sets;
    storing subscriber functions consistent with said default function sets in default data records of a subscriber database, each single default data record being common to a plurality of default subscribers whose subscriber functions correspond to the subscriber functions in the default data record concerned;
    storing subscriber functions for each special subscriber in subscriber-specific data records of a subscriber database, each subscriber-specific data record being specific to the special subscriber concerned;
    reading the subscriber functions for each default subscriber of said plurality of default subscribers from the default data record concerned;
    reading the subscriber functions for each special subscriber from the subscriber-specific data record for the subscriber concerned; and
    managing subscriber functions in the telecommunication network by using subscriber functions read from the default data record and from the subscriber-specific data record.

2. The method of claim 1, further comprising providing in data indicating whether the subscriber is a default subscriber or a special subscriber in conjunction with the telephone number of the subscriber.

3. The method of claim 1, further comprising providing performing a check,
    when changes are made in the subscriber functions for a special subscriber to establish whether the changed functions correspond to any one of the default function sets; and
    redefining, if the changed functions correspond to one of the default function sets, the special subscriber concerned as a default subscriber.

4. The method of claim 1, wherein the subscriber functions for a special subscriber are not stored in a subscriber specific data record until one of said functions is activated for use.

5. The method of claim 1, wherein the default definitions are subscriber type-specific.

6. A system comprising:
one or more default data records, in which subscriber functions consistent with default function sets are stored and from which the subscriber functions for default subscribers are read, each single default data record being common to a plurality of default subscribers whose subscriber functions correspond to the subscriber functions in the default data record concerned;
one or more subscriber-specific data records, in which the subscriber functions for each special subscriber are stored and from which they are read; and
a managing unit configured to manage subscriber functions of subscribers in a telecommunications network with the one or more subscriber-specific data records and the one or more default data records.

7. The system of claim 6, comprising a unit configured to provide data indicating whether the subscriber is a default subscriber or a special subscriber in conjunction with the telephone number of the subscriber.

8. The system of claim 6, comprising a checking unit configured to check when the subscriber functions for a special subscriber are changed, to establish whether the changed functions correspond to any one of the default function sets and by which a special subscriber is redefined as a default subscriber if the changed functions correspond to one of the default function sets.

9. The system of claim 6, wherein the subscriber functions for a special subscriber are not stored in a subscriber specific data record until one of the functions in question is activated for use.

10. The system of claim 6, comprising a checking unit configured to check the default definitions are subscriber type-specific.

11. An apparatus, comprising:
defining means for defining one or more default function sets, each default function set comprising one or more subscriber functions of a digital telephone exchange defined as default functions;
partitioning means for partitioning subscribers of said digital telephone exchange into default subscribers and special subscribers, said default subscribers being those subscribers whose subscriber functions correspond to one of said default function sets, and said special subscribers being those subscribers whose subscriber functions do not correspond to any of said default function sets;
storing means for storing subscriber functions consistent with said default function sets in default data records of a subscriber database, each single default data record being common to a plurality of default subscribers whose subscriber functions correspond to the subscriber functions in the default data record concerned;
storing means for storing subscriber functions for each special subscriber in subscriber-specific data records of a subscriber database, each subscriber-specific data record being specific to the special subscriber concerned;
reading means for reading the subscriber functions for each default subscriber of said plurality of default subscribers from the default data record concerned;
reading means for reading the subscriber functions for each special subscriber from the subscriber-specific data record for the subscriber concerned; and
managing means for managing subscriber functions in the telecommunication network by using subscriber functions read from the default data record and from the subscriber-specific data record.

\* \* \* \* \*